(12) United States Patent
Berrio et al.

(10) Patent No.: US 8,438,064 B2
(45) Date of Patent: May 7, 2013

(54) PAYMENT PROCESSING SYSTEM FOR USE IN A RETAIL ENVIRONMENT HAVING SEGMENTED ARCHITECTURE

(75) Inventors: Gaston Berrio, Greensboro, NC (US); Michael James Symonds, Greensboro, NC (US); Ronald Philip Klinc, Wake Forest, NC (US); Andrew Richard Pearce, Raleigh, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 13/287,786

(22) Filed: Nov. 2, 2011

(65) Prior Publication Data
US 2012/0046787 A1 Feb. 23, 2012

Related U.S. Application Data

(63) Continuation of application No. 12/689,983, filed on Jan. 19, 2010.

(60) Provisional application No. 61/145,578, filed on Jan. 18, 2009.

(51) Int. Cl.
*G06Q 20/00* (2012.01)
*G06Q 1/12* (2006.01)

(52) U.S. Cl.
USPC .................................. 705/16; 705/18; 705/21

(58) Field of Classification Search .................... 705/16, 705/18, 21
See application file for complete search history.

(56) References Cited

U.S. PATENT DOCUMENTS

| | | | | |
|---|---|---|---|---|
| 4,055,746 A | * | 10/1977 | Peterson | 235/380 |
| 4,750,130 A | * | 6/1988 | Shimamura et al. | 705/413 |
| 5,394,336 A | * | 2/1995 | Warn et al. | 700/236 |
| 5,831,861 A | * | 11/1998 | Warn et al. | 700/231 |
| 5,889,676 A | | 3/1999 | Kubo et al. | |
| D413,337 S | * | 8/1999 | Keane et al. | D15/9.2 |
| 6,032,126 A | * | 2/2000 | Kaehler | 705/16 |
| 6,070,156 A | * | 5/2000 | Hartsell, Jr. | 705/413 |
| 6,078,888 A | * | 6/2000 | Johnson, Jr. | 705/50 |
| 6,116,505 A | * | 9/2000 | Withrow | 235/381 |
| 6,321,984 B1 | | 11/2001 | McCall et al. | |

(Continued)

OTHER PUBLICATIONS

J2 Retail system Targets, Tolkoff, Sarah. Orange county Business Journal 31.39 (Sep. 29-Oct. 5, 2008.*

(Continued)

*Primary Examiner* — Matthew S Gart
*Assistant Examiner* — Harshad Parikh
(74) *Attorney, Agent, or Firm* — Nelson Mullins Riley & Scarborough LLP (57) ABSTRACT

A payment processing system and method comprising a POS module providing an interface to effect sales of FGS in a retail environment, a device module operatively connected to at least one retail device configured to supply FGS and comprising a card reader adapted to receive a first payment card data for payment for the FGS, wherein the device module is adapted to control operation of the at least one retail device, and a payment system module operatively connected to the POS module and the device module, the payment system module adapted to validate payment for the FGS. The payment system module and the device module are separated from the POS module in order to segment a portion of the payment processing system configured to handle payment card data from a portion of the system that does not handle payment card data.

27 Claims, 3 Drawing Sheets

U.S. PATENT DOCUMENTS

| | | | | |
|---|---|---|---|---|
| 6,470,233 | B1 * | 10/2002 | Johnson, Jr. | 700/237 |
| 6,736,313 | B1 * | 5/2004 | Dickson | 235/380 |
| 6,882,900 | B1 * | 4/2005 | Terranova | 700/237 |
| 6,978,661 | B2 * | 12/2005 | Hutchinson et al. | 73/49.2 |
| 7,082,406 | B1 * | 7/2006 | Dickson | 705/24 |
| 7,201,315 | B2 * | 4/2007 | Symonds et al. | 235/383 |
| 7,469,826 | B2 * | 12/2008 | Ciancio et al. | 235/383 |
| 7,624,042 | B2 * | 11/2009 | Negley et al. | 705/16 |
| 7,637,365 | B2 * | 12/2009 | Ringdahl et al. | 194/205 |
| 7,725,351 | B1 * | 5/2010 | Williams | 705/16 |
| 7,752,133 | B2 * | 7/2010 | Rich et al. | 705/40 |
| 7,810,722 | B2 * | 10/2010 | Dodson | 235/381 |
| 7,953,968 | B2 * | 5/2011 | Robertson et al. | 713/150 |
| 8,108,272 | B2 * | 1/2012 | Sorbe et al. | 705/30 |
| 8,285,506 | B2 * | 10/2012 | Oldham et al. | 702/85 |
| 8,376,185 | B2 * | 2/2013 | Liebal et al. | 222/59 |
| 2002/0147648 | A1 * | 10/2002 | Fadden et al. | 705/16 |
| 2004/0079799 | A1 * | 4/2004 | Symonds et al. | 235/381 |
| 2004/0182921 | A1 | 9/2004 | Dickson et al. | |
| 2004/0204999 | A1 * | 10/2004 | Negley et al. | 705/16 |
| 2005/0080679 | A1 * | 4/2005 | Barton et al. | 705/16 |
| 2005/0091661 | A1 * | 4/2005 | Kurien et al. | 719/310 |
| 2005/0145015 | A1 * | 7/2005 | Hutchinson et al. | 73/40.5 R |
| 2005/0205157 | A1 * | 9/2005 | Hutchinson | 141/311 A |
| 2006/0012479 | A1 * | 1/2006 | Ezra | 340/572.1 |
| 2007/0033398 | A1 * | 2/2007 | Robertson et al. | 713/168 |
| 2007/0106559 | A1 * | 5/2007 | Harrell | 705/21 |
| 2007/0250391 | A1 * | 10/2007 | Prade et al. | 705/16 |
| 2007/0294340 | A1 * | 12/2007 | Rothschild | 709/203 |
| 2008/0126213 | A1 * | 5/2008 | Robertson et al. | 705/21 |
| 2008/0147539 | A1 | 6/2008 | Robertson | |
| 2008/0154427 | A1 * | 6/2008 | Siler | 700/232 |
| 2008/0249880 | A1 * | 10/2008 | Liu et al. | 705/14 |
| 2008/0262936 | A1 * | 10/2008 | Paardekooper et al. | 705/21 |
| 2008/0295568 | A1 * | 12/2008 | Nanaji et al. | 73/1.34 |
| 2009/0084840 | A1 * | 4/2009 | Williams et al. | 235/379 |
| 2009/0089214 | A1 * | 4/2009 | Weston et al. | 705/73 |
| 2009/0103725 | A1 * | 4/2009 | Tang et al. | 380/45 |
| 2009/0129403 | A1 * | 5/2009 | Harrell et al. | 370/467 |
| 2009/0132381 | A1 * | 5/2009 | Gangi | 705/18 |
| 2009/0164326 | A1 * | 6/2009 | Bishop et al. | 705/19 |
| 2009/0164330 | A1 * | 6/2009 | Bishop et al. | 705/19 |
| 2009/0164331 | A1 * | 6/2009 | Bishop et al. | 705/19 |
| 2009/0289113 | A1 * | 11/2009 | Vilnai et al. | 235/381 |
| 2010/0017284 | A1 * | 1/2010 | Ross et al. | 705/14.33 |
| 2010/0094733 | A1 * | 4/2010 | Shapira et al. | 705/30 |
| 2010/0114724 | A1 * | 5/2010 | Ghosh et al. | 705/24 |
| 2010/0146421 | A1 * | 6/2010 | New | 715/764 |
| 2010/0268612 | A1 * | 10/2010 | Berrio et al. | 705/16 |
| 2010/0280956 | A1 * | 11/2010 | Chutorash et al. | 705/64 |
| 2010/0306069 | A1 * | 12/2010 | Austin et al. | 705/16 |
| 2010/0312631 | A1 * | 12/2010 | Cervenka | 705/14.37 |
| 2010/0325003 | A1 * | 12/2010 | Ringeman et al. | 705/21 |
| 2010/0332385 | A1 * | 12/2010 | Mersky | 705/40 |
| 2011/0125597 | A1 * | 5/2011 | Oder et al. | 705/16 |
| 2011/0134044 | A1 * | 6/2011 | Carapelli | 345/168 |
| 2011/0153436 | A1 * | 6/2011 | Krampe | 705/16 |
| 2011/0202413 | A1 * | 8/2011 | Stewart et al. | 705/16 |
| 2011/0231648 | A1 * | 9/2011 | Robertson et al. | 713/150 |
| 2011/0238510 | A1 * | 9/2011 | Rowen et al. | 705/16 |
| 2012/0016725 | A1 * | 1/2012 | Kraft et al. | 705/14.11 |
| 2012/0022956 | A1 * | 1/2012 | Payne et al. | 705/16 |
| 2012/0046787 | A1 * | 2/2012 | Berrio et al. | 700/237 |
| 2012/0059694 | A1 * | 3/2012 | Kuebert et al. | 705/14.4 |
| 2012/0078736 | A1 * | 3/2012 | Denzer et al. | 705/16 |
| 2012/0078741 | A1 * | 3/2012 | DeLine | 705/26.1 |
| 2012/0084211 | A1 | 4/2012 | Petrov et al. | |
| 2012/0095853 | A1 * | 4/2012 | von Bose et al. | 705/16 |
| 2012/0095854 | A1 * | 4/2012 | Randazza et al. | 705/16 |
| 2012/0116575 | A1 * | 5/2012 | Prosser et al. | 700/232 |
| 2012/0221420 | A1 * | 8/2012 | Ross | 705/16 |
| 2012/0265625 | A1 * | 10/2012 | Pletz et al. | 705/16 |
| 2012/0330763 | A1 * | 12/2012 | Gangi | 705/16 |
| 2013/0013431 | A1 * | 1/2013 | Fansler et al. | 705/18 |

OTHER PUBLICATIONS

VeriFone Holdings_SEcure PumpPAY, Anonymous, Pharma Business Work, Sep. 29, 2008: 2074.*
Your Guide to POS revolution Anonymous, National Petroleum News, 92.4, Apr. 2000: 46.*
International Search Report and Written Opinion dated Mar. 29, 2010 (5 pgs.) for corresponding PCT International Application No. PCT/US2010/021423.
Press release issued by ISD Corporation dated Sep. 2, 2010 (1 pg.).
ANDI brochure, Allied Electronics, Inc., undated (2 pgs.).
Wayne Fusion brochure entitled "A New Level of Control" dated 2011 (5 pgs.).
NeXGen brochure entitled "The Next Generation of Forecourt Control", Allied Electronics, Inc., undated (2 pgs.).
VeriFone V910 brochure, dated 2010 (1 pg.).
Verifone V900 and VIPER brochure, dated 2007 (2 pgs.)

* cited by examiner

PAYMENT PROCESSING SYSTEM FOR USE IN A RETAIL ENVIRONMENT HAVING SEGMENTED ARCHITECTURE

CROSS-REFERENCE TO RELATED APPLICATIONS

The present application is a continuation of U.S. patent application Ser. No. 12/689,983 (entitled "Payment Processing System for Use in a Retail Environment Having Segmented Architecture" and filed on Jan. 19, 2010, in the name of Berrio, et al.), which claims the benefit of U.S. patent application Ser. No. 61/145,578 (entitled "Segmentation of Payment Processing in a Retail Environment" and filed on Jan. 18, 2009). The entire disclosure of each of the foregoing applications is hereby incorporated by reference as if set forth verbatim in its entirety herein and relied upon for all purposes.

FIELD OF THE INVENTION

The present invention relates generally to payment processing systems and, more particularly, to payment processing systems used in a retail fueling environment.

BACKGROUND OF THE INVENTION

Payment cards, such as credit cards and debit cards, have become a convenient and preferable method of payment at a number of retail environments, including grocery stores, fueling stations, and other retailers. Accepting payment cards as a method of payment subjects these establishments to security standards and regulations promulgated by the Payment Card Industry ("PCI," also referred to as the PCI Security Standards Council). These standards include the Payment Application-Data Security Standard ("PA-DSS," also referred to as the PCI Data Security Standard) created in an attempt to prevent fraud and other security issues that arise due to the acceptance of payment cards and the transmission of sensitive information associated with the payment cards, such as account number, account holder information, and personal identification numbers ("PIN").

PA-DSS sets forth standards and requirements that must be met by both software and hardware components used to receive, store, transmit, or otherwise handle the sensitive information. Additionally, software and hardware components that are unrelated to the portions configured to handle the sensitive information are subject to the PA-DSS if they are part of the same physical device. The software and hardware components that do not handle sensitive information may include portions that are programmed or created to perform functions unrelated to payment processing. Nonetheless, the entire device must be compliant with PA-DSS because it, in part, handles sensitive information.

By way of an example, several components in a retail fueling environment, i.e., a fueling station, are not designed to handle payment card information. For instance, the point-of-sale ("POS") device may include software components adapted to display a graphical user interface ("GUI") that provides the station's manager with the ability to set options associated with the POS or the fueling station, such as the appearance of the receipts issued by the station's dispensers. If the GUI includes portions that are considered noncompliant pursuant to PA-DSS, then the entire POS will also be considered noncompliant. This makes it difficult to change any portion of the overall system, because all such changes must comply with PA-DSS even when unrelated to payment processing. The changed device may then be subject to an arduous certification process.

SUMMARY OF THE INVENTION

The present invention recognizes and addresses the foregoing considerations, and others, of prior art construction and methods.

In this regard, one aspect of the present invention provides a payment processing system in a retail environment comprising a point-of-sale (POS) module providing an interface for use by an operator of the retail environment to effect sales of fuel, goods, or services (FGS) in the retail environment, a device module operatively connected to at least one retail device configured to supply FGS, the at least one retail device comprising a card reader adapted to receive a first payment card data of a first payment card for payment for the FGS, wherein the device module is adapted to control operation of the at least one retail device, and a payment system module operatively connected to the POS module and the device module, the payment system module adapted to validate payment for the FGS. The payment system module and the device module are separated from the POS module in order to segment the payment system module and the device module that handle the first payment card data from the POS module that does not handle the first payment card data.

Another aspect of the present invention provides a payment processing system in a retail environment comprising a point-of-sale device (POS) configured to provide an interface, wherein the interface is configured to facilitate sales of fuel, goods, or services (FGS) in the retail environment, a payment transaction device operatively connected to the POS and configured to effect payment transactions for the FGS, and a first payment device operatively connected to the payment transaction device and configured to receive a first payment card data from a first payment card. A first portion of the retail environment comprising the POS is segmented from a second portion of the retail environment comprising the payment transaction device and the first payment device in order to segment the second portion that is configured to handle sensitive payment information from the first portion that is not configured to handle sensitive payment information.

Yet another aspect of the present invention provides a method for effecting transactions involving payment card data in a retail environment for fuel, goods, or services (FGS) offered by the retail environment, the method comprising the steps of providing a sales device configured to conduct transactions for the sale of the FGS offered by the retail environment, providing a transaction device operatively connected to the sales device and configured to effect payment transactions using the payment card data for the sale of the FGS offered by the retail environment, providing a payment card device operatively connected to the transaction device, wherein the payment card device is configured to receive the payment card data, and segmenting the sales device that is not configured to handle the payment card data from the transaction device and the payment card device that are configured to handle the payment card data.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
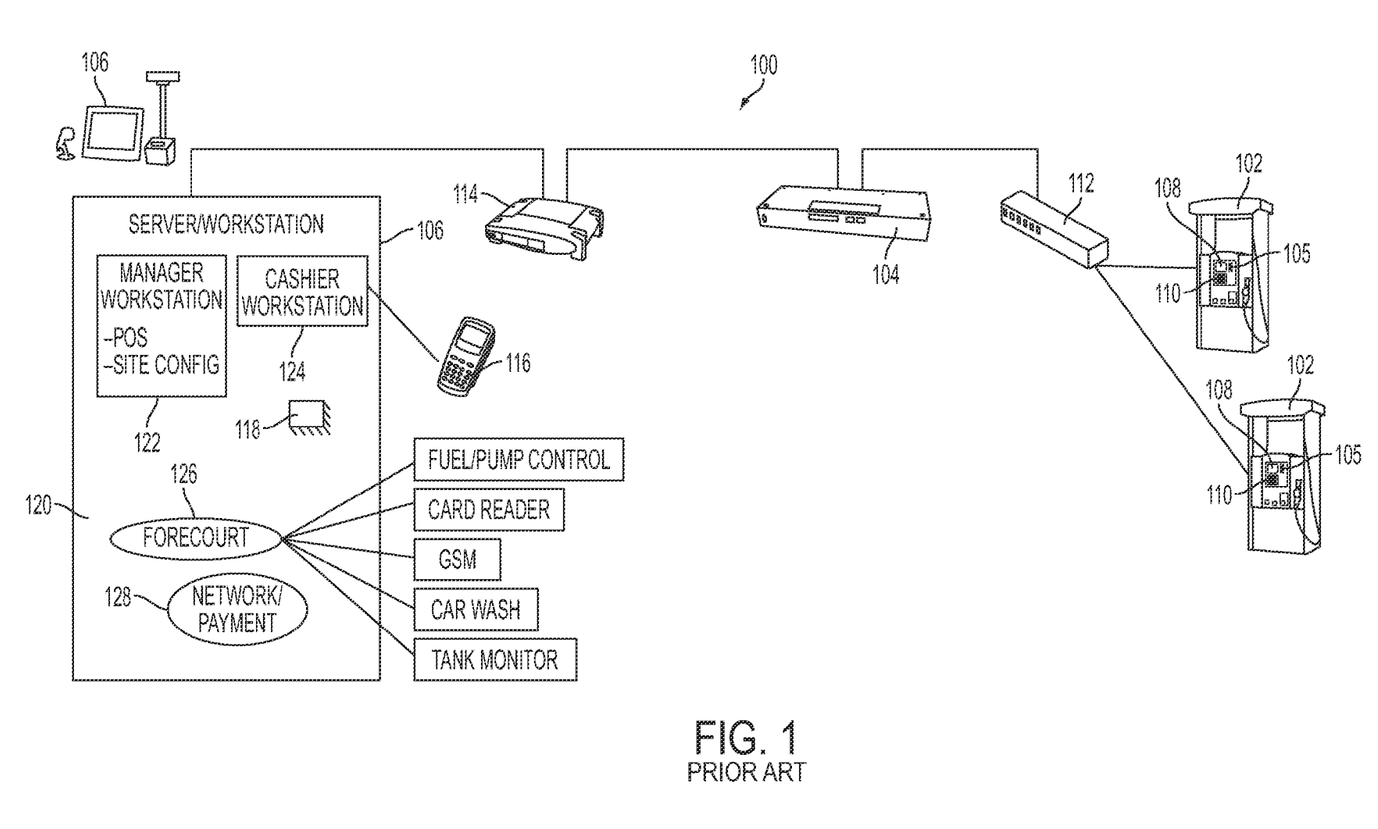
FIG. 1 is a schematic representation of an exemplary payment processing system in a retail fueling environment of the prior art.

FIG. 1 illustrates an exemplary retail fueling environment 100 in accordance with the prior art. Retail fueling environment 100 comprises one or more fuel dispensers 102, a dispenser hub 104, and a server/workstation 106 (hereinafter "server 106"). Each dispenser 102 comprises a customer interface that includes a card reader 105 for reading payment cards, such as credit, debit, or smart cards. As should be understood by those of ordinary skill in the art, the customer interface may include additional components, such as displays 108 and pinpads 110. Dispensers 102 are operatively connected to dispenser hub 104, which may be accomplished via additional devices, such as distribution box or "d-box" 112, as is understood in the art. Dispenser hub 104 is operatively connected to server 106, which may also be accomplished via one or more intermediate devices, such as router 114. Server 106 is operatively connected to a card reader 116 and includes a processor 118 and computer readable medium 120. It should be understood that server 106 is operatively connected to a wide area network ("WAN"), such as the Internet, either directly or via one or more other devices, such as router 114.

In the present example, card reader 116 is a small separate device that includes a pinpad and is configured to receive the information from a payment card swiped or inserted into the reader and to accept a personal identification number ("PIN") entered into the pinpad by a user in certain circumstances.

In the present example, processor 118 executes several software modules located on server 106 including manager workstation module 122, cashier workstation module 124, forecourt module 126, and network payment module 128. The program instructions for software modules 122, 124, 126, and 128 are located on computer readable medium 120.

When executed, manager workstation module 122 displays a GUI that allows the owner, operator, or manager of the fueling station to set options for the fueling environment. Manager workstation module 122 is also adapted to provide point-of-sale ("POS") capabilities, including the ability to conduct transactions for items offered for sale by the fueling station, such as the fuel provided by dispensers 102. Similarly, cashier workstation module 124 provides the station's cashier, clerk, or employee the means necessary to effect a transaction for one or more items or services offered by the fueling station. In another embodiment, manager workstation module 122 and cashier workstation module 124 are the same module. Cashier workstation module 124 is operatively connected to, and controls the operation of, card reader 116.

Forecourt module 126 is adapted to control the operation of devices located in the "forecourt" of retail fueling environment 100 and includes program logic, subroutines, and/or other modules that perform specific functions in this regard. In this example, forecourt module 126 comprises several modules, including fuel/pump control, card reader, GSM, car wash, and tank monitor modules as illustrated in FIG. 1. The fuel/pump control module handles operation of dispensers 102, while the car wash module handles operation of any on-site car washes. The tank monitor module handles operation of any tank monitors connected to the underground storage tanks of the retail fueling environment. The card reader module handles operation of the card readers of retail fueling environment 100, such as card readers 105 of dispensers 102. The GSM module is a security module that handles encryption of the sensitive information transmitted by the components of retail fueling environment 100. For instance, any payment card data received by card readers 105 is handled by the card reader module and encrypted by the GSM module. One example of the GSM module is explained in more detail in U.S. Published Patent Application No. 2009/0154696 (entitled "System and Method for Secure Keypad Protocol Emulation in a Fuel Dispenser Environment"), the entire disclosure of which is hereby incorporated by reference for all purposes as if set forth verbatim herein.

Network payment module 128 is operatively connected to cashier workstation module 124 and forecourt module 126, as well as any other modules or software applications within the fueling environment that require validation of payment card information. For instance, network payment module 128 performs validation of the payment card information received by card readers 105 (via forecourt module 126), as well as card reader 116 (via cashier workstation module 124), as described in more detail below.

In operation, a user positions a vehicle adjacent to one of dispensers 102 and uses the dispenser to refuel the vehicle. For payment, the user inserts and removes a payment card from card reader 105. Card reader 105 reads the information on the payment card and transmits the information to forecourt module 126 via d-box 112, dispenser hub 104, and router 114. It should be understood that data containing sensitive information may be encrypted prior to being transmitted, thereby rendering the communication paths involved secure. The forecourt module 126 provides the payment information to network payment module 128, which contacts a host computer or system operated by the financial institution associated with the user's payment card via the WAN. The financial institution either validates or denies the transaction and transmits such a response to network payment module 128. The information received from the financial institution's host computer system is transmitted from network payment module 128 back to forecourt module 126 to handle appropriately. This may include transmitting to dispenser 102 a request that the user provide another payment card if the transaction is denied or printing a receipt if authorized.

Alternatively, the user may enter a convenience store portion of the retail fueling environment to pay for the dispensed fuel. In this instance, the user inserts and removes a payment card from card reader 116, which transmits the payment card data received from the payment card to cashier workstation module 124. Cashier workstation module 124 provides the payment information to network payment module 128, which contacts the financial institution's system associated with the payment card. The information received from the financial institution is transmitted from network payment module 128 back to cashier workstation module 124 to handle appropriately. This may include instructing a printer connected to server 106 to provide a receipt to the user for the transaction.

Additionally, a user may enter the convenience store portion of the retail fueling environment to purchase one or more of the items offered by the store. The cashier or clerk uses cashier workstation module 124 running on server 106 to tally the total amount of the items the user seeks to purchase. Cashier workstation module 124 communicates with card reader 116, which requests that the user insert his payment card. The user inserts and removes the payment card using card reader 116 and may also enter his PIN using the card reader 116. Card reader 116 transmits the payment card information from the payment card and provides it to the cashier workstation 124, which in turn provides the information to network payment module 128. Network payment module 128 then attempts to process the payment of the transaction in a manner similar to that described above.

In this embodiment, components not designed to handle payment card information, such as manager workstation module 122 and cashier workstation module 124, are included in server 106 along with components designed specifically to handle payment card information, such as network payment module 128. If either module 122 or 124 does not comply with PA-DSS, then the entire server 106 is considered not to be in compliance, including network payment module 128, even if the network payment module would be in compliance standing alone.

For additional information regarding retail fueling environments, reference is made to U.S. Pat. Nos. 6,453,204 (entitled "Fuel Dispensing System"), 5,956,259 (entitled "Intelligent Fueling"), 5,734,851 (entitled "Multimedia Video/Graphics in Fuel Dispensers"), 6,052,629 (entitled "Internet Capable Browser Dispenser Architecture"), 5,689,071 (entitled "Wide Range, High Accuracy Flow Meter"), and 6,935,191 ("entitled "Fuel Dispenser Fuel Flow Meter Device, System and Method"), all of which are hereby incorporated by reference for all purposes as if set forth verbatim herein.

Figure 2:
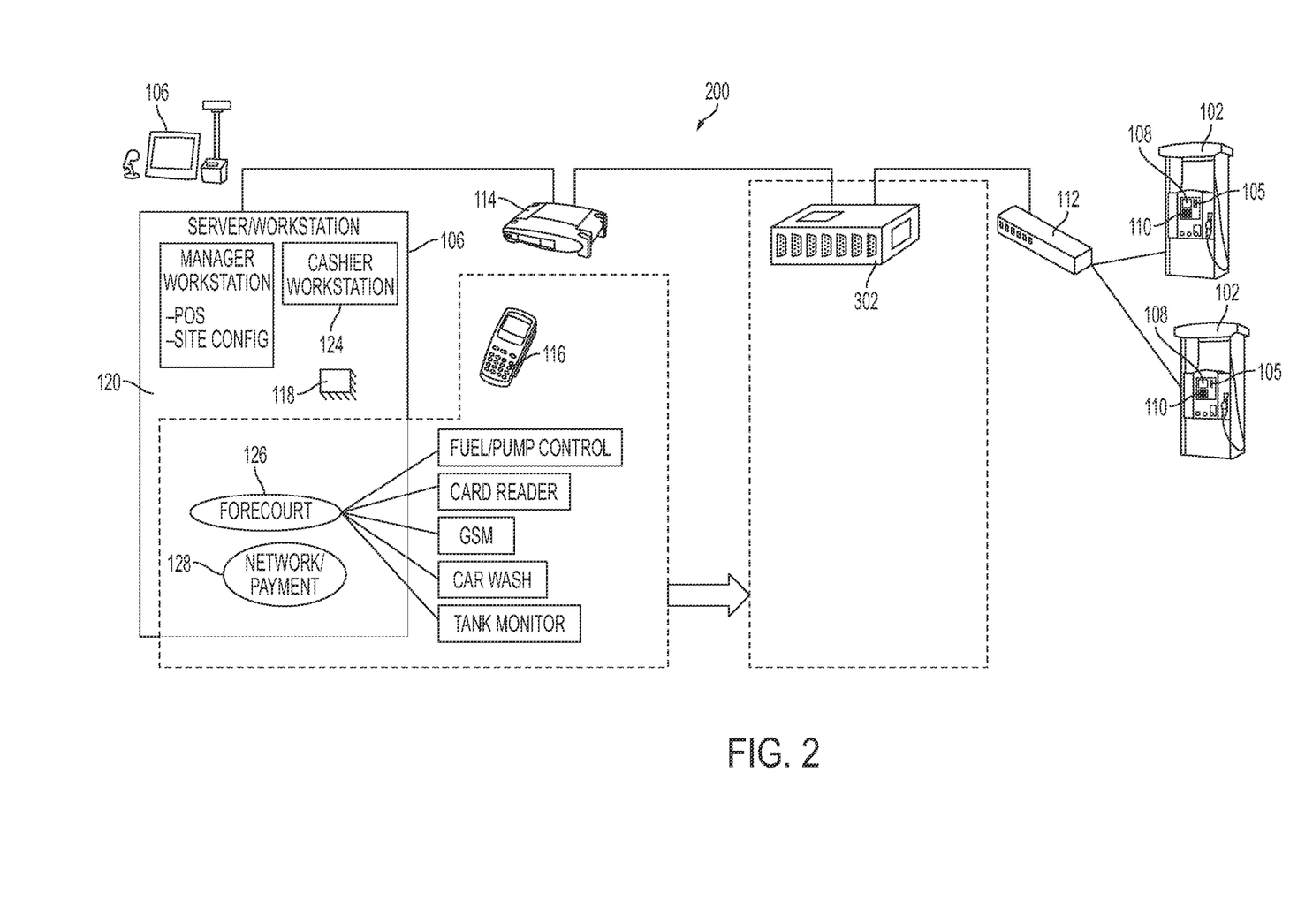
FIGS. 2 and 3 are schematic representations of payment processing systems in a retail fueling environment in accordance with embodiments of the present invention.

FIG. 2 illustrates a retail fueling environment 200 in accordance with an embodiment of the present invention. Retail fueling environment 200 is similar to retail fueling environment 100 of FIG. 1 in many respects, but illustrates a separation and relocation of components of the environment designed to handle payment card information from those components that are not. In this exemplary embodiment, forecourt module 126 and network payment module 128 are relocated to the dispenser hub, which thus becomes an "enhanced" dispenser hub 302 as explained in more detail below. Moreover, as will be explained, card reader 116 is also functionally relocated.

Figure 3:
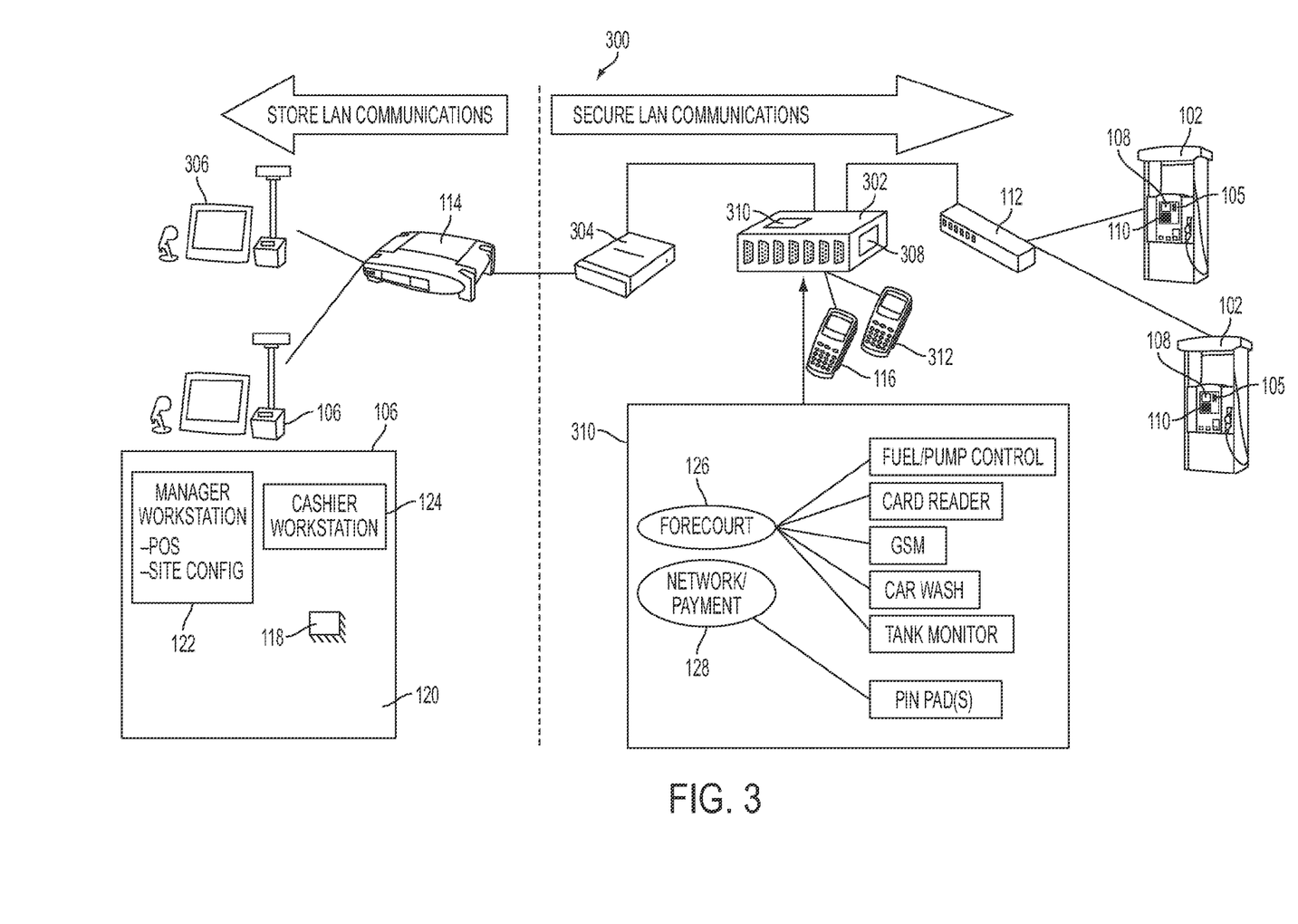

FIG. 3 illustrates a retail fueling environment 300 in accordance with an embodiment of the present invention. As can be seen, dispenser hub 104 of FIG. 1 has been replaced with an enhanced dispenser hub 302. Additionally, a PCI router 304 operatively connects enhanced dispenser hub 302 to router 114 and to the WAN as explained below. Retail fueling environment 300 includes an additional POS 306 in comparison with fueling environments 100 and 200 (FIGS. 1 & 2, respectively). It should be understood that the illustrated components are exemplary in nature, and other devices, such as additional computers, servers, and other hardware or software, may be added to the environment as needed or desired. For example, POS 306 may perform additional marketing functions or other functions desired or required to manage the fueling station.

In the presently-described embodiment, enhanced dispenser hub 302 comprises a processing device 308 and computer readable medium 310. It should be understood that computer readable medium 310 may be any appropriate electronic storage device, such as random access memory ("RAM"), flash memory, EPROMs, hard drives, solid-state storage, CD-ROMs, CDs, DVDs, etc., as long as it is capable of being accessed by processing device 308. Likewise, processing device 308 may be any appropriate processing device capable of accessing computer readable medium 310 and executing the instructions, modules, or software stored thereon including a processor, microprocessor, controller, or microcontroller.

Forecourt module 126 and network payment module 128 are stored on computer readable medium 310 and adapted to be executed by processing device 308. Manager workstation module 122 and cashier workstation module 124 remain located on the computer readable medium 120 of server 106. Card reader 116 is operatively connected to enhanced dispenser hub 302, as is additional card reader 312. Additional software modules may be stored on computer readable medium 310 and executed by processing device 308 as needed. As should be understood, modules may be standalone programs, applications, services, dynamic linked libraries, or a combination or portion thereof. In some embodiments, modules may be hardware or firmware, such as a relay board or microprocessor programmed to perform a specific function.

In this embodiment, PCI router 304 is operatively connected to the WAN and handles communications between devices within retail fueling environment 300 and devices external to the environment via the WAN. In this embodiment, for instance, PCI router 304 is PA-DSS compliant and configured to communicate securely with the financial institution, as well as enhanced dispenser hub 302, in order to effect transactions involving payment cards. PCI router 304 is also operatively connected to router 114 in order to handle communications between server 106 and POS 306 and other devices both internal and external to retail fueling environment 300.

In operation, a user refuels a vehicle using one of dispensers 102 and uses card reader 105 to provide payment information in a manner similar to that described above with respect to FIG. 1. Card reader 105 transmits the payment card information to forecourt module 126, located on enhanced dispenser hub 302. Forecourt module 126 transmits the payment card information necessary to effect a transaction to network payment module 128, which attempts to validate the transaction with the host system of the financial institution associated with the payment card. In this example, payment card information (subject to the requirements of PA-DSS) is handled only by dispensers 102, d-box 112, and enhanced dispenser hub 302. Accordingly, only these devices need to meet and comply with the requirements of PA-DSS.

In the embodiment of FIG. 1, a portion of cashier workstation module 124 manages the operation of card reader 116. In the embodiment of FIG. 3, that portion of cashier workstation module 124 has been extracted and relocated onto computer readable medium 310. Thus, the portion of cashier workstation module 124 managing card reader 116, which handles payment card information, is also located on enhanced dispenser hub 302 and executed by processing device 308. This modular portion may also manage the operation of one or more additional card readers 312. It should be understood that while card reader 116 may be associated with and physically adjacent to either server 106 or POS 306, it is operatively connected to enhanced dispenser hub 302. Accordingly, any data output by card readers 116 and 312 is transmitted to enhanced dispenser hub 302.

Rather than using card reader 105, the user may enter the convenience store to pay for the dispensed fuel. In this example, fuel dispenser 102 transmits data representative of the fueling transaction, such as the total amount due from the user for the dispensed fuel. Enhanced dispenser hub 302 retains any sensitive information in the data but otherwise transmits the non-sensitive data to server 106. At this point, the user may select other fuel, goods, or services offered by the store for purchase. The cashier uses server 106 or POS 306 to perform functions necessary to prepare the transaction to sell the items. For instance, the cashier may use the GUI provided by cashier workstation module 124 running on server 106 to tally the total amount of the items the user seeks to purchase, including any dispensed fuel and tax.

Once the necessary steps have been taken to prepare the transaction as should be known in the art, the transaction information necessary for payment processing, such as total price, is transmitted by cashier workstation module 124 via router 114 and PCI router 304 to enhanced dispenser hub 302. Card reader 116 receives instructions from the module executing on enhanced dispenser hub 302 and requests the user to insert the user's payment card and to provide the corresponding PIN (if necessary). Card reader 116 transmits the payment card information to network payment module 128 which processes the payment in a manner similar to that described above. Payment module 128 and/or card reader 116 transmits the response from the financial institution of the payment processing to cashier workstation module 124 in order for the module to perform additional functions unrelated to the handling of payment card information, such as removing the items purchased by the user from the store's running inventory or printing a receipt confirming the transaction. Accordingly, server 106 and POS 306 are not configured to handle sensitive information, such as payment card data.

Cashier workstation module 124, as well as server 106 and additional POS 306, may perform a number of additional functions, all of which are unrelated to handling payment card information. Because these software and hardware components do not handle payment card information, they are not subject to PA-DSS. Accordingly, these components have been effectively segmented from the software and hardware components that are subject to compliance with PA-DSS. It should be apparent from the above description that only those devices handling or transmitting payment card information, including dispensers 102, d-box 112, enhanced hub 302, and card readers 116 and 312, need to be certified as compliant with PA-DSS. As a result, all modules of the system that are subject to PA-DSS regulations are segmented from the modules of the system that do not require PA-DSS compliance. The computers that comprise only modules that do not require PA-DSS compliance, such as server 106 and POS, also do not require PA-DSS compliance. The segmented architecture avoids the labor and expense required to certify compliance of the devices that do not include modules that handle sensitive information. Additionally, a fewer number of devices and a smaller footprint of the system are subject to PA-DSS compliance. Thus, a smaller portion of the system architecture will need to be changed or upgraded should the applicable security regulations change.

In another embodiment configured to maintain the segmentation of the devices within retail fueling environment 300 configured to handle payment card data from those that are not, enhanced dispenser hub 302 may be configured to create secure reports regarding the financial transactions performed by the enhanced dispenser hub. The secure reports are encrypted and password protected in order to prevent the reports from unauthorized access. Because the reports are secure, users may access the secure reports for which they have proper authorization from devices that do not require PA-DSS compliance. For instance, a manager may select, retrieve, and open a secure report using POS 306 without subjecting the POS to PA-DSS compliance. A more detailed explanation regarding the secure reports is set forth in U.S. patent application Ser. No. 12/544,995 (entitled "Secure Reports for Electronic Payment Systems"), the entire disclosure of which is hereby incorporated by reference for all purposes as if set forth verbatim herein.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. For example, aspects of one embodiment may be combined with aspects of other embodiments to yield still further embodiments. Therefore, it is contemplated that any and all such embodiments are included in the present invention as may fall within the scope and spirit thereof.

What is claimed is:

1. A retail fueling environment comprising:
 a first portion of the retail fueling environment that is configured to handle only non-sensitive transaction information, the first portion comprising:
  a point-of-sale device (POS) configured to facilitate a sale of fuel, goods, or services for use by an operator of the fueling environment to perform functions unrelated to handling of sensitive payment information;
 a second portion of the retail fueling environment that is configured to handle sensitive payment information and the non-sensitive transaction information, the second portion comprising:
  a plurality of fuel dispensers, each having a customer interface including a card reader and a PIN pad to receive sensitive payment information, the customer interface being configured to transmit the sensitive payment information;
  a secure hub device operatively connected to the plurality of fuel dispensers and the POS, the secure hub device being operative to:
   receive the sensitive payment information from the customer interfaces of the fuel dispensers;
   receive the non-sensitive transaction information from the fuel dispensers;
   separately route the sensitive payment information and non-sensitive transaction information such that the secure hub device:
    transmits the sensitive payment information to a financial institution system operatively connected to the secure hub device via an external network and does not transmit the sensitive payment information to the POS; and
    transmits the non-sensitive transaction information including information indicative of the fuel dispensed and non-sensitive customer identification information to the POS; and allow dispensing of fuel at the fuel dispensers or sale of goods or services upon receipt of authorization from the financial institution system;

wherein the first portion of the retail fueling environment is segmented from the second portion so that the second portion handles the sensitive payment information and the non-sensitive transaction information and the first portion handles only the non-sensitive transaction information.

2. The retail fueling environment of claim 1 comprising:
a secure router operatively connected to the secure hub device; and
a store router operatively connected to the POS and the secure router, wherein the first portion of the retail fueling environment comprises the store router and the second portion of the retail fueling environment comprises the secure router.

3. The retail fueling environment of claim 1, wherein the secure hub device is a separate physical device from the POS and the plurality of fuel dispensers.

4. The retail fueling environment of claim 1 comprising at least one underground storage tank associated with at least one tank monitor, wherein the secure hub device is configured to receive tank monitor data from the at least one tank monitor.

5. The retail fueling environment of claim 1 comprising a car wash, wherein the secure hub device is configured to handle operation of the car wash.

6. The retail fueling environment of claim 1, wherein the secure hub device is configured to handle operation of the plurality of fuel dispensers.

7. The retail fueling environment of claim 1 comprising a payment device associated with and located adjacent to at least a portion of the POS and operatively connected to the secure hub device, the payment device being configured to receive and transmit the sensitive payment information to the secure hub device, wherein the second portion of the retail fueling environment comprises the payment device.

8. A secure hub device for a retail fueling environment, whereby the retail fueling environment comprises a first portion that is configured to handle only non-sensitive transaction information and a second portion that is configured to handle sensitive payment information and the non-sensitive transaction information,
wherein the second portion of the retail fueling environment comprises a plurality of fuel dispensers, each having a customer interface including a card reader and a PIN pad to receive sensitive payment information, the customer interface being configured to transmit the sensitive payment information,
wherein the first portion of the retail fueling environment comprises a point-of-sale device (POS), wherein the POS is configured to facilitate a sale of fuel, goods, or services for use by an operator of the fueling environment to perform functions unrelated to handling of the sensitive payment information, and
wherein the secure hub device being operative when connected for communication with the plurality of fuel dispensers and the POS to:
receive the sensitive payment information from the customer interfaces of the fuel dispensers;
receive the non-sensitive transaction information from the fuel dispensers;
separately route the sensitive payment information and non-sensitive transaction information such that the secure hub device:
transmits the sensitive payment information to a financial institution system operatively connected to the secure hub device via an external network and does not transmit the sensitive payment information to the POS; and
transmits the non-sensitive transaction information to the POS; and
allow dispensing of fuel at the fuel dispensers or sale of goods or services upon receipt of authorization from the financial institution system;
wherein the first portion of the retail fueling environment is segmented from the second portion so that the second portion handles the sensitive payment information and the non-sensitive transaction information and the first portion handles only the non-sensitive transaction information.

9. The secure hub device of claim 8 being operative to create a report comprising at least a portion of the transaction information.

10. The secure hub device of claim 9, wherein the report is a secure report comprising at least a portion of the sensitive payment information.

11. The secure hub device of claim 8 being operative to receive tank monitor data from a tank monitor of the retail fueling environment.

12. The secure hub device of claim 8 being operative to handle operation of a car wash of the retail fueling environment.

13. A secure hub device comprising:
a processing device;
memory operatively connected to the processing device comprising:
a payment data software module configured to process sensitive payment data and non-sensitive transaction information for a transaction, wherein the sensitive payment data is received from at least one payment device of a retail fueling environment at which the sensitive payment data is provided by a customer, and wherein the non-sensitive transaction information is received from the at least one payment device of the retail fueling environment;
a point-of-sale software module configured to communicate with a point-of-sale device (POS) of the retail fueling environment including providing non-sensitive data for the transaction to the POS; and
a transaction software module configured to transmit the sensitive payment data to a host configured to effect payment for the transaction and does not transmit the sensitive payment information to the POS so that the sensitive payment information and non-sensitive transaction information are separately routed; and
wherein the secure payment hub device enables a first portion of the retail fueling environment comprising the POS to be segmented from a second portion of the retail fueling environment comprising the at least one payment device so that the first portion handles only the non-sensitive data for the transaction.

14. The secure hub device of claim 13, wherein the at least one payment device comprises a payment card reader of a fuel dispenser of the retail fueling environment.

15. The secure hub device of claim 14, wherein the at least one payment device comprises a PIN pad of the fuel dispenser.

16. The secure hub device of claim 13, wherein the at least one payment device is a payment card reader associated with and located adjacent to at least a portion of the POS.

17. The secure hub device of claim 16, wherein the at least one payment device comprises a payment card reader of a fuel dispenser of the retail fueling environment.

18. The secure hub device of claim 13 comprising a housing that is physically different from the POS and the at least one payment device.

19. The secure hub device of claim 13, wherein the memory comprises a forecourt software module configured to control operation of at least one device located in a forecourt of the retail fueling environment.

20. The secure hub device of claim 19, wherein the forecourt software module comprises a fuel pump module, wherein the at least one device located in the forecourt comprises at least one fuel pump and the fuel pump software module is configured to control the at least one fuel pump.

21. The secure hub device of claim 13, wherein the memory comprises a tank monitor software module configured to receive data from a tank monitor connected to an underground storage tank of the retail fueling environment.

22. The secure hub device of claim 13, wherein the memory comprises a car wash software module configured to handle operation of a car wash of the retail fueling environment.

23. A method for effecting a transaction for a retail fueling environment that includes a first portion comprising a point-of-sale device (POS) and a second portion comprising at least one payment device and at least one fuel dispenser, wherein the first portion of the retail fueling environment is configured to handle only non-sensitive data, and wherein the second portion of the retail fueling environment is configured to handle sensitive payment data and the non-sensitive data, the method comprising:

provlding, in the second portion, a secure hub device operatively connected to the POS, the at least one payment device, and the at least one fuel dispenser, wherein the secure hub device is configured to communicate the non-sensitive data associated with the transaction to the POS and to receive the sensitive payment data associated with the transaction from the payment device;

receiving the sensitive payment data from the payment device;

receiving the non-sensitive data from the payment device;

separately routing the sensitive payment data and non-sensitive data such that the secure hub device:

transmits at least a portion of the sensitive payment data from the payment device to a host system to effect payment for the transaction and does not transmit the sensitive payment data to the POS; and transmits the non-sensitive data including information indicative of fuel dispensed and non-sensitive customer identification information to the POS; and receiving confirmation data associated with the transaction from the host system;

wherein the first portion of the retail fueling environment is segmented from the second portion so that the second portion handles the sensitive payment data and the non-sensitive data and the first portion handles only the non-sensitive data.

24. The method of claim 23, wherein the at least one fuel dispenser comprises the at least one payment device.

25. The method of claim 23, wherein the at least one payment device comprises a first payment card reader associated with and located adjacent to at least a portion of the POS and a second payment card reader included in the at least one fuel dispenser.

26. The method of claim 23, wherein the at least one payment device is associated with and located adjacent to the POS.

27. The method of claim 23, wherein the non-sensitive data transmitted to the POS comprises a non-sensitive portion of the confirmation data received from the host system.

* * * * *